United States Patent
Doepfert et al.

(10) Patent No.: US 12,503,199 B2
(45) Date of Patent: Dec. 23, 2025

(54) ASSEMBLY FOR ACTUATING A SHIFTING ELEMENT OF A TRANSMISSION

(71) Applicant: ZF Friedrichshafen AG, Friedrichshafen (DE)

(72) Inventors: Hagen Doepfert, Lindau (DE); Peter Ziemer, Bad Woerishofen (DE); Thomas Riedisser, Sigmarszell (DE); Ulrich Doerr, Constance (DE); Uwe Schraff, Markdorf (DE); Markus Strobel, Ravensburg (DE); Christoph Margraf, Markdorf (DE); Uwe Griesmeier, Markdorf (DE); Leschek Debernitz, Eriskirch (DE); Michel Wiemer, Weingarten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/835,628

(22) PCT Filed: Feb. 1, 2023

(86) PCT No.: PCT/EP2023/052371
§ 371 (c)(1),
(2) Date: Aug. 2, 2024

(87) PCT Pub. No.: WO2023/148182
PCT Pub. Date: Aug. 10, 2023

(65) Prior Publication Data
US 2025/0145250 A1      May 8, 2025

(30) Foreign Application Priority Data
Feb. 3, 2022   (DE) .................. 102022201129.5

(51) Int. Cl.
*B62M 11/04*     (2006.01)
*F16H 63/18*     (2006.01)
*F16H 63/38*     (2006.01)

(52) U.S. Cl.
CPC ............. *B62M 11/04* (2013.01); *F16H 63/18* (2013.01); *F16H 63/38* (2013.01)

(58) Field of Classification Search
CPC .......... B62M 11/04; F16H 63/18; F16H 63/38
See application file for complete search history.

(56) References Cited

U.S. PATENT DOCUMENTS

| 7,874,955 | B2 * | 1/2011 | Patterson ................. B62J 13/04 475/312 |
| 2009/0088284 | A1 | 4/2009 | Patterson |
| 2011/0115189 | A1 | 5/2011 | Patterson |

FOREIGN PATENT DOCUMENTS

| DE | 9015515 U1 | 3/1991 |
| DE | 102015217013 A1 | 3/2017 |

(Continued)

OTHER PUBLICATIONS

German Search Report for Application No. 102022201129.5 Dated Sep. 16, 2022.

(Continued)

*Primary Examiner* — Victor L Macarthur
(74) *Attorney, Agent, or Firm* — Dority & Manning, P.A.

(57) ABSTRACT

An arrangement for actuating a shift element of a gearbox includes a rotatably mounted and preloaded shift pawl (2) and a shift ring (3) with an outer toothing (4) and assigned to a gearbox element. A first end (8) of the shift pawl (2) is assigned to the outer toothing (4) of the shift ring (3) so as to lock or release the shift ring (3) in order to shift a gear stage, and a second end (9) of the shift pawl (2) is assigned to a shift gate (6) of a shift drum (5) that actuates the shift (Continued)

pawl (2). The shift pawl (2) is operatively connected to at least one double torsion spring (10) in order to apply a preload force.

10 Claims, 2 Drawing Sheets

(56) References Cited

FOREIGN PATENT DOCUMENTS

| | | | |
|---|---|---|---|
| DE | 102019220043 A1 | 6/2021 | |
| DE | 102019220044 A1 | 6/2021 | |
| EP | 2567888 A1 | 2/2013 | |
| JP | H06263080 A | 9/1994 | |
| JP | H06298153 A | 10/1994 | |

OTHER PUBLICATIONS

International Search Report For Application No. PCT/EP2023/052371 Dated Apr. 5, 2023.

* cited by examiner

ASSEMBLY FOR ACTUATING A SHIFTING ELEMENT OF A TRANSMISSION

CROSS-REFERENCE TO RELATED APPLICATIONS

The present application is related and has right of priority to German Patent Application No. DE 102022201129.5 filed on Feb. 3, 2022, and is a U.S. national phase of PCT/EP2023/052371 filed on Feb. 1, 2023, both of which are incorporated by reference in their entireties for all purposes.

TECHNICAL FIELD

The present invention relates generally to an arrangement for actuating a shift element of a gearbox. The invention further relates generally to a shift pawl for locking or releasing a shift ring and to a bicycle or a pedelec having the arrangement.

BACKGROUND

For example, the publication DE 10 2019 220 044 A1 describes a bottom bracket gearbox in a planetary gear set design for a bicycle or a pedelec having an arrangement for actuating at least one brake shift element. The bottom bracket gearbox has multiple planetary gear sets for implementing various gear stages. Multiple brake shift elements are assigned to the bottom bracket gearbox, each of which has a brake ring that is assigned to a gearbox component and can be locked or released via a brake pawl in order to shift a predetermined associated gear stage. The brake pawls are rotatably mounted on a common pin, a first end of each brake pawl being assigned to an outer toothing of the associated brake ring and a second end of each brake pawl being assigned to a shift gate of a rotatable shift drum for actuating the brake pawl. In order to hold the shift pawl in the locked position, a compression spring is assigned to the first end of the brake pawl, the first end of the brake pawl being assigned to the outer toothing. The compression spring is secured in a bore in the housing and applies the necessary preload force onto the brake pawl.

BRIEF SUMMARY

Example aspects of the present invention provide an arrangement for actuating a shift element of a gearbox and a shift pawl for locking or releasing a shift ring. Example aspects of the present invention also provide a bicycle or pedelec having the arrangement, in which an installation space-neutral springing and a smooth-running operation of the shift pawl are ensured.

Example aspects of the invention therefore relates to an arrangement for actuating a shift element in a housing of a gearbox having a shift ring, which has an outer toothing and is assigned to a gearbox element, and having a rotatably mounted and preloaded shift pawl. A first end of the shift pawl is assigned to the outer toothing of the shift ring so as to lock or release the shift ring in order to shift a gear stage, and a second end of the shift pawl is assigned to a shift gate of a shift drum that actuates the shift pawl. In order to achieve an installation space-neutral springing and a smooth-running mode of operation of the shift pawl, the shift pawl is operatively connected to at least one double torsion spring or the like in order to apply a preload force.

In this way, in the arrangement according to example aspects of the invention, the double torsion spring is fastened around the rotation axis of the shift pawl such that the spring force of the double torsion spring acts on the shift pawl in a uniform manner. Consequently, the actuation of the shift pawl is optimized, without the need for additional installation space.

In order to permit a particularly uniform transmission of force from the double torsion spring onto the pawl, the double torsion spring has two legs, which extend approximately parallel to each other and are arranged preferably symmetrically on the shift pawl. Therefore, when the preload force is applied in order to pivot the shift pawl, a force is applied on both sides, thereby reliably preventing the shift pawl from tilting and thus from jamming in the outer toothing of the shift ring.

A structurally particularly simple design for accommodating the double torsion spring on the shift pawl can be achieved in the arrangement according to example aspects of the invention in that the shift pawl has a recess for the rotatable mounting on a pin as a rotation axis, wherein the shift pawl has, on each of the two sides of the recess, a cylindrical receiving region, or the like, which extends in an axial direction for the legs of the double torsion spring.

In order to ensure that the legs of the double torsion spring are accommodated and guided on the shift pawl, the receiving regions provided on both sides in the axial direction on the shift pawl have an axial width which corresponds at least to the width of each leg of the double torsion spring.

Due to the fact that each leg of the double torsion spring is assigned to a receiving region, each leg surrounds, at least in sections, the associated receiving region in the circumferential direction, as a result of which a symmetrical introduction of the preload force onto the shift pawl is ensured.

In order to further increase the preload force applied by the double torsion spring, it can be provided that each leg of the double torsion spring is wound multiple times about the associated receiving region. Therefore, the legs of the double torsion spring can also have multiple windings on each side when there is a sufficient amount of axial installation space available.

Within the framework of an example development of the invention, a first common end of the legs of the double torsion spring is supported on the first end of the shift pawl, which is assigned to the shift ring, and a second common end of the legs of the double torsion spring is supported on the housing. Preferably, the double torsion spring and the shift pawl can have a predetermined amount of radial play, so that the double torsion spring is reliably prevented from becoming radially fixedly clamped on the receiving regions of the shift pawl also when the shift pawl undergoes a maximum pivoting motion.

Preferably, the first common end of the legs of the double torsion spring can lie in, or be supported on, a depression, a shoulder, or the like assigned to the first end of the shift pawl. In this way, the torsion spring is retained by its first end of the leg radially in position on the shift pawl.

A particularly cost-effective production of the double torsion spring can be achieved by producing the double torsion spring from a spring steel wire or the like.

In order to further reduce the costs to produce the double torsion spring, it can be provided that the two ends of the spring steel wire are arranged opposite one another at a predetermined distance from one another in the region of the first common end of the legs of the double torsion spring. Therefore, connecting the two ends during production is eliminated. In addition, assembly is simplified due to the open end on the double torsion spring.

A next example aspect of the invention separately includes the structural configuration of the above-described shift pawl for locking or releasing the shift ring, for example, for the above-described arrangement. At least the double torsion spring, which is also described above, is provided on the claimed shift pawl in order to apply a preload force, resulting in the above-described advantages and further advantages.

A further example aspect of the invention includes a bicycle or a pedelec, having the above-described arrangement and/or the above-described shift pawl, resulting in the above-described advantages and further advantages.

BRIEF DESCRIPTION OF THE DRAWINGS

Example aspects of the present invention are explained in greater detail in the following with reference to the drawings, wherein.

DETAILED DESCRIPTION

Figure 1:
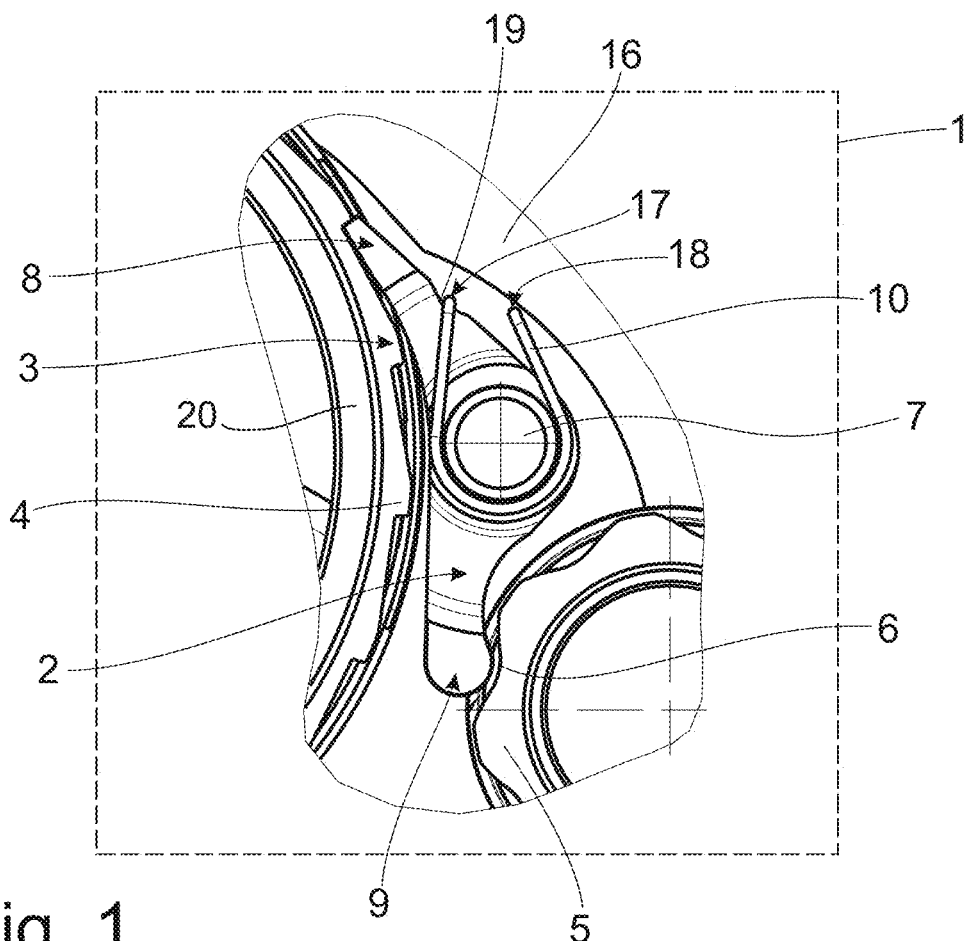
FIG. 1 shows a schematic view of one possible embodiment variant of an arrangement according to example aspects of the invention for actuating a shift element of a gearbox, having a shift pawl which is provided with a double torsion spring.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIG. 1 a schematic view of an arrangement for actuating a shift element, for example, a brake shift element, in a housing 16 of a gearbox, for example, in a bottom bracket gearbox, of a bicycle or a pedelec 1 is shown as an example.

Assigned to each shift element, or brake shift element, is a rotatably mounted and preloaded shift pawl 2 and a shift ring 3, which has an outer toothing 4 and is assigned to a gearbox element 20. In FIG. 1, the preloaded shift pawl 2 is shown in the position that is locking the shift ring 3.

In order to actuate, for example, multiple shift pawls 2, a common shift drum 5 is assigned to the shift pawls 2. The shift drum 5 has multiple shift gates 6 which are arranged axially next to one another on its outer circumference, wherein one shift gate 6 is assigned to each shift pawl 2 in order to actuate the shift pawl 2. The shift pawls 2 are rotatably mounted on a common pin 7.

A first end 8 of the shift pawl 2 is assigned to the outer toothing 4 of the shift ring 3 so as to lock or release the shift ring 3 in order to shift a gear stage, while a second end 9 of the shift pawl 2 is assigned to the shift gate 6 of the shift drum 2.

In order to achieve an installation space-neutral springing and a smooth-running pivoting of the shift pawl 2, the shift pawl 2 is operatively connected to a double torsion spring 10 in order to apply a preload force.

Figure 2:
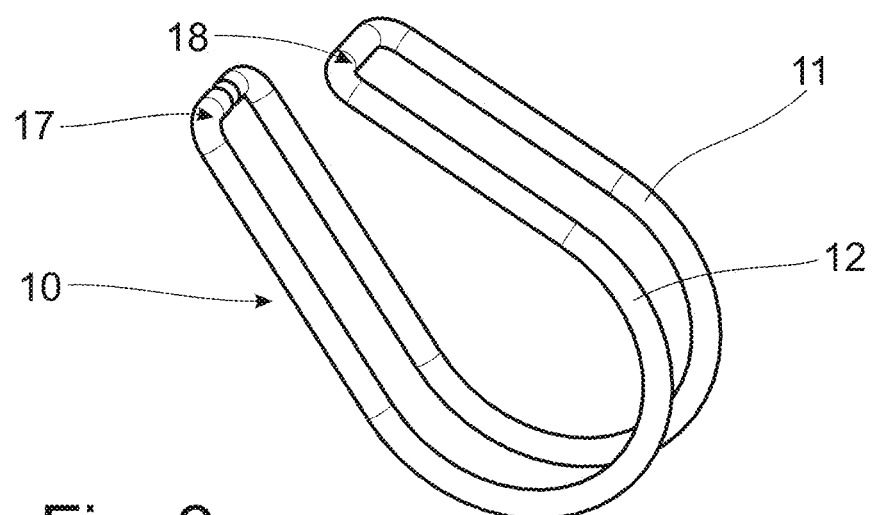
FIG. 2 shows a schematic three-dimensional single-part view of the double torsion spring.
Figure 4:
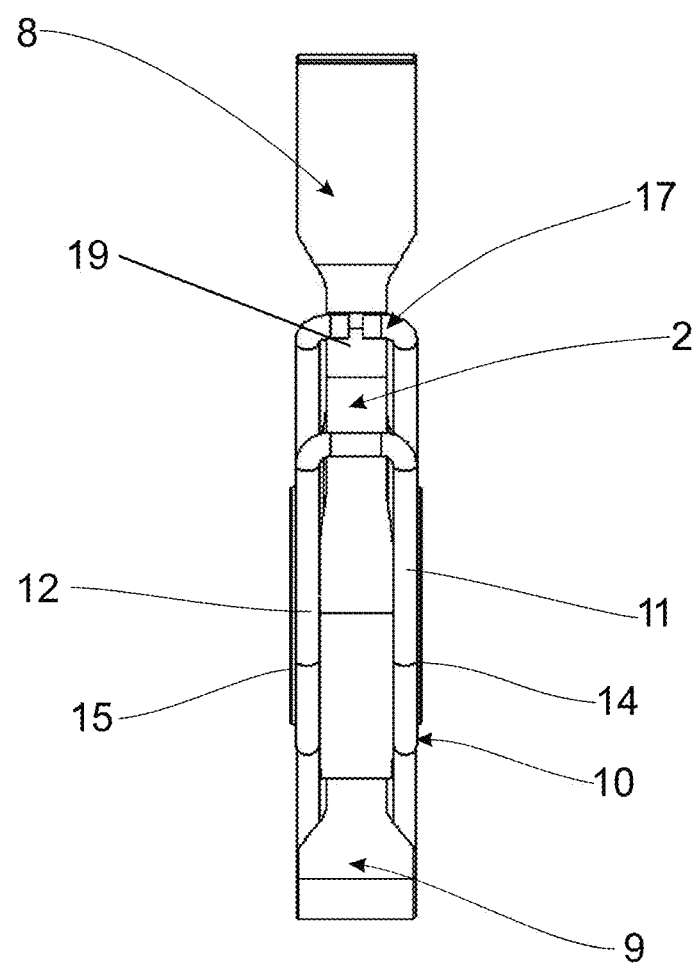
FIG. 4 shows a schematic top view of the shift pawl with the double torsion spring.

As is apparent, in particular, from FIG. 2, the double torsion spring 10 has two legs 11, 12, which extend approximately parallel to one another. The two legs 11, 12, which extend parallel to one another, are arranged symmetrically on the shift pawl 2, as is apparent, in particular, from FIG. 4.

The shift pawl 2 has a recess 13 for the rotatable mounting on the pin 7 as the rotation axis, wherein the shift pawl 2 has, on each of the two sides of the recess 13, a cylindrical receiving region 14, 15 which extends in an axial direction for the legs 11, 12 of the double torsion spring 10 more or less as a projection or shoulder.

Figure 3:
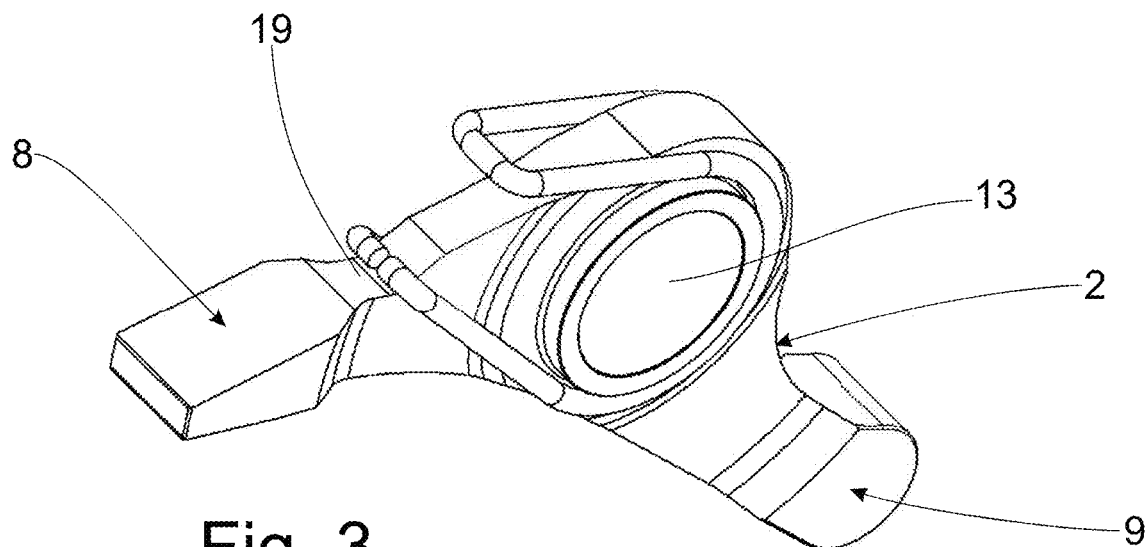
FIG. 3 shows a schematic three-dimensional single-part view of the shift pawl with the double torsion spring.

The shift pawl 2 is preferably prefabricated from hardened steel with the double torsion spring 10, which is in the form of an insertion spring, prior to installation. In order to be mounted on the shift pawl 2, the double torsion spring 10 is elastically bent upward on both sides at the legs 11, 12 and snapped into place via the two cylindrical shoulders, or receiving regions 14, 15, provided on each of the two sides. Therefore, the double torsion spring 10 surrounds the shift pawl 2 on both sides, as is apparent, in particular, from FIGS. 3 and 4.

The receiving regions 14, 15 on the shift pawl 2, which are arranged on both sides when viewed axially, are used not only for the radial and axial guidance of the legs 11, 12 of the double torsion spring 10 but also as specific contact surfaces for the shift pawl 2 on the housing 16, in order to ensure the smooth-running of the shift pawl 2 and to prevent edge wear or a scraping-off of chips when the shift pawl 2 rotates with respect to the housing 16.

The axial width of the receiving regions 14, 15 on the shift pawl 2 is greater than the width of each leg 11, 12, or greater than the diameter of the spring steel wire from which the double torsion spring 10 is produced. Furthermore, the double torsion spring 10 preferably fits axially against the shift pawl 2, in order to compensate for tolerances and to avoid scraping against the housing 16.

A first common end 17 of the legs 11, 12 of the double torsion spring 10 is supported against the first end 8 of the shift pawl 2, which is assigned to the shift ring 3, while a second common end 18 of the legs 11, 12 of the double torsion spring 20 is supported on the housing 16. The first common end 17 of the legs 11, 12 of the double torsion spring 10 lies in a depression 19 on the first end of the shift pawl 2 in order to hold the double torsion spring 10 radially in position. The second common end 18 of the legs 11, 12 of the double torsion spring 10 lies in a pocket-shaped recess in an inner wall of the housing 16, which has already been necessarily provided in the housing 16 for installing the shift pawl 2.

The two ends of the spring steel wire of the legs 11, 12 of the double torsion spring 10 are arranged opposite one another at a predetermined distance from one another in the region of the first common end 17 of the legs 11, 12 of the double torsion spring 10. Consequently, the first common end 17 is an open end.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 bicycle or pedelec
2 shift pawl
3 shift ring
4 outer toothing
shift drum
6 shift gate
7 pin
8 first end of the shift pawl
9 second end of the shift pawl
10 double torsion spring
11 leg
12 leg
13 recess as rotation axis
14 cylindrical receiving region
15 cylindrical receiving region
16 housing
17 first common end
18 second common end
19 depression

The invention claimed is:

1. An arrangement for actuating a shift element of a gearbox, comprising:
   a shift ring (3) with an outer toothing (4), the shift ring (3) being operatively connected with a gearbox element;
   a shift pawl (2), the shift pawl (2) being rotatably mounted, a first end (8) of the shift pawl (2) being selectively engageable with the outer toothing (4) of the shift ring (3) so as to lock or release the shift ring (3) in order to shift a gear stage, and a second end (9) of the shift pawl (2) being in engagement with a shift gate (6) of a shift drum (5) that is rotatable to actuate the shift pawl (2); and
   a double torsion spring (10) operatively connected to the shift pawl (2), the double torsion spring (10) applying a preload force on the shift pawl (2).

2. The arrangement of claim 1, wherein the double torsion spring (10) comprises two legs (11, 12) that extend approximately parallel to each other and are symmetrically arranged on the shift pawl (2).

3. The arrangement of claim 2, wherein:
   the shift pawl (2) defines a recess (13) for rotatable mounting on a pin (7) as a rotation axis; and
   the shift pawl (2) comprises a pair of cylindrical receiving regions (14, 15) extending in an axial direction for the two legs (11, 12) of the double torsion spring (10), each of the pair of cylindrical receiving regions (14, 15) being disposed on a respective side of the recess (13).

4. The arrangement of claim 3, wherein the pair of cylindrical receiving regions (14, 15) have an axial width corresponding at least to a respective width of each of the two legs (11, 12) of the double torsion spring (10).

5. The arrangement of claim 3, wherein each of the two legs (11, 12) of the double torsion spring (10) is received in a respective one of the pair of cylindrical receiving regions (14, 15), and each of the two legs (11, 12) of the double torsion spring (10) at least partially surrounds the respective one of the pair of cylindrical receiving regions (14, 15) in a circumferential direction.

6. The arrangement of claim 2, wherein first common ends (17) of the two legs (11, 12) of the double torsion spring (10) are supported on the first end (8) of the shift pawl (2), and second common ends (18) of the two legs (11, 12) of the double torsion spring (10) are supported on a housing (16).

7. The arrangement of claim 6, wherein the first common ends (17) of the two legs (11, 12) of the double torsion spring (10) lie in a depression (19) on the first end (8) of the shift pawl (2).

8. The arrangement of claim 2, wherein the double torsion spring (10) is made of a spring steel wire.

9. The arrangement of claim 8, wherein two ends of the spring steel wire are arranged opposite each other at a predetermined distance from each other at first common ends (17) of the two legs (11, 12) of the double torsion spring (10).

10. A bicycle or pedelec (1), comprising the arrangement of claim 1.

* * * * *